(12) United States Patent
Sadiku (10) Patent No.: US 11,843,290 B2
(45) Date of Patent: Dec. 12, 2023

(54) COIL FORMER, WINDING DEVICE AND METHOD FOR THE OPERATION THEREOF TO PRODUCE COIL WINDINGS INTENDED FOR INSERTION IN A STATOR

(71) Applicant: Schaeffler ELMOTEC STATOMAT GmbH, Karben (DE)

(72) Inventor: Sadik Sadiku, Neuberg (DE)

(73) Assignee: Schaeffler ELMOTEC STATOMAT GmbH, Karben (DE)

( * ) Notice: Subject to any disclaimer, the term of this patent is extended or adjusted under 35 U.S.C. 154(b) by 167 days.

(21) Appl. No.: 16/608,873

(22) PCT Filed: Apr. 23, 2018

(86) PCT No.: PCT/EP2018/060356
§ 371 (c)(1),
(2) Date: Oct. 28, 2019

(87) PCT Pub. No.: WO2018/197422
PCT Pub. Date: Nov. 1, 2018

(65) Prior Publication Data
US 2020/0091801 A1 Mar. 19, 2020

(30) Foreign Application Priority Data
Apr. 27, 2017 (DE) ..................... 10 2017 109 100.9

(51) Int. Cl.
*H02K 15/04* (2006.01)
*B21F 3/04* (2006.01)

(52) U.S. Cl.
CPC ........... *H02K 15/0442* (2013.01); *B21F 3/04* (2013.01); *H02K 15/045* (2013.01); *H02K 15/0435* (2013.01)

(58) Field of Classification Search
CPC ........... H02K 15/0442; H02K 15/0435; H02K 15/045
See application file for complete search history.

(56) References Cited

U.S. PATENT DOCUMENTS 5,232,026 A * 8/1993 Hensel ............... H02K 15/0442
140/92.1

FOREIGN PATENT DOCUMENTS

DE          3222181          12/1983
DE      10 013 21 05          5/2015
(Continued)

OTHER PUBLICATIONS

Written Opinion for PCT/EP2018/060356 (dated 2019).*
(Continued)

*Primary Examiner* — Livius R. Cazan (57) ABSTRACT

The invention relates to a coil former (1) for winding conductor wire (100) into coil windings (101), in particular for subsequent insertion in a stator carrier, said coil former having a coil former front (2) and a coil former rear (3), wherein the coil former front (2) and the coil former rear (3) span, by means of a peripheral surface (4), a spiral winding path (P) around a spiral axis (W) for the conductor wire (100), and wherein support elements (10, 11) are arranged along the winding path (P) and protrude beyond the peripheral surface (4) and laterally delimit the spiral winding path (P). The invention also relates to a winding device (50) having a coil former (1) of this kind and to a method for operating the winding device (50).

8 Claims, 5 Drawing Sheets

(56) References Cited

FOREIGN PATENT DOCUMENTS

DE     102013221205 A1 *  5/2015  ......... H02K 15/0435
EP         0574841         12/1993
WO    WO 2018/197422      11/2018

OTHER PUBLICATIONS

International Search Report and the Written Opinion dated Jul. 16, 2018 From the International Searching Authority Re. Application No. PCT/EP2018/060356 and Its Translation of Search Report Into English. (10 Pages).
Communication Pursuant to Article 94(3) EPC dated Oct. 29, 2021 From the European Patent Office Re. Application No. 18 720 211.4. (5 Pages).

* cited by examiner

COIL FORMER, WINDING DEVICE AND METHOD FOR THE OPERATION THEREOF TO PRODUCE COIL WINDINGS INTENDED FOR INSERTION IN A STATOR

RELATED APPLICATIONS

This application is a National Phase of PCT Patent Application No. PCT/EP2018/060356 having International filing date of Apr. 23, 2018, which claims the benefit of priority of German Patent Application No. 10 2017 109 100.9 filed on Apr. 27, 2017. The contents of the above applications are all incorporated by reference as if fully set forth herein in their entirety.

FIELD AND BACKGROUND OF THE INVENTION

The present disclosure relates to a coil former as cl described herein, to a winding device having such a coil former as described herein, as well as to a method for operating such a winding device as described herein.

Winding device drawing-in tool for drawing in for generating coil windings and for equipping the coil windings in groups into a stator are known from the prior art. The coil windings are generated by helically winding conductor wire, typically enameled copper wire, about a coil former, and are subsequently deposited in a drawing-in tool. To this end, the conductor wire emanating from a wire storage unit is guided by way of a wire infeed installation to the coil former. A differentiation is made between so-called fly-frame methods in which the wire infeed installation is guided about the coil former, and winding methods in which the coil former is rotated.

It is furthermore known for a plurality of conductor wires to be guided beside one another to the coil former and to thus simultaneously apply a plurality of parallel running conductor wires to the coil former.

The drawing-in tool has a flat ring from a multiplicity of drawing-in lamellas that are uniformly distributed across the circumference. When the coil windings of one current phase are placed about the drawing-in lamellas, the free ends of the drawing-in lamellas are guided through a front opening up to a rear opening of a stator carrier. The coil windings are drawn through the stator carrier by means of a drawing-in star which by way of protrusions travels through the intermediate spaces between the drawing-in lamellas, and said coil windings in an orderly winding sequence drop from the drawing-in tool into drawing-in grooves between stator teeth of the stator carrier. This procedure known per se is not to be discussed in more detail here because said procedure is not the direct subject matter of the present invention. However, it is to be stated that the drawing-in procedure can be carried out in a relatively rapid manner while the winding of the individual coil windings ultimately requires more time. Moreover, the correct deposition of the individual windings of one coil winding in the drawing-in tool is decisive in order for a high filling factor of the drawing-in grooves to be achieved and for efficiency losses of the motor on account of eddy currents in the drawing-in grooves to be avoided. The quantity of electrical conductor wires, including the insulation layer thereof, introduced into the available winding space, in particular the drawing-in groove, is referred to as the mechanical fill factor. This means that it is to be avoided when winding and sloughing-off the coil windings that windings of the conductor wire overtake adjacent windings. However, this is often not achieved in the prior art. The efficiency of large electric motors by virtue of the mains operation has thus in many instances not been fully exploited in the past. Efficiency is awarded particularly high importance in the case of a mobile application using accumulators, in particular in the field of e-mobility.

A further disadvantage of the prior art is a very great length of the coil formers so as to be able to deposit the required number of windings for the drawing-in grooves of comparatively large stators completely on the coil former. This leads to massive and sluggish design embodiments of the coil formers in order for the latter to be positionally true and dimensionally stable during the winding procedure. This renders the machines large and expensive in procurement, and results in large setting-up areas. The problem is particularly pronounced in the case of a parallel wire winding and guiding of a plurality of tensioned individual wires as a pack, because this leads to a significant increase in the tensile force associated with the risk of damage to the wires be wound, or to the device.

SUMMARY OF THE INVENTION

It is therefore the object of the invention to overcome the disadvantages of the prior art and to find a solution by way of which coil windings for the later drawing-in in stators can be produced in a cost-effective manner, said solution moreover achieving the precondition for being able to provide a stator having a high fill factor of the drawing-in grooves as well as a high efficiency of the electric motor. Ideally, a high production rate of the coil winding in a compact machine size is to contribute toward this end. The solution should moreover be simple in terms of handling and reliable in operation.

Main features of the disclosed subject matter are set forth herein. Design embodiments are also described herein.

The invention relates to a coil former for winding conductor wire so as to form coil windings, which has a coil former front part and a coil former rear part, wherein the coil former front part and the coil former rear part by way of a circumferential face define for the conductor wire a helical winding path about a helix axis. Support elements which project beyond the circumferential face and, particularly in portions, laterally delimit the helical winding path are disposed along the winding path.

The advantage of the support elements according to the invention is that it can be prevented that the sequence of individual windings of the coil windings is changed when sloughing-off. A further advantage is that the support elements permit a multiple-layer winding to the coil former. On account thereof, the required length of the coil former can be reduced by the factor which corresponds to the number of layers; that is to say that in the case of two layers a coil former of only half the length is required in order for a coil winding having the same conductor length to be wound. The entire machine can thus be conceived in a more compact manner because lower leveraged forces are exerted on the coil former by the tensioned conductor wires. All conductor wires should be of the same diameter. This renders the machine cost effective and the required setting-up area small. The coil former serves in particular for preparing the coil windings in terms of being drawn into a stator carrier, or the individual drawing-in grooves of the latter, respectively.

According to one special design embodiment, the support elements are disposed in such a manner that the helical winding path has a homogenous width. This supports in particular a cohesion of the conductor wires that lie in an adjacent manner between the support elements. On account thereof, a second layer on conductor wires on the first layer does not urge the lower conductor wires apart, for example. The support elements are preferably elongate and are aligned between being transverse to the helix axis and being parallel to the winding path. On account thereof, the windings of the winding path can lie tightly beside one another. This is also facilitated when the width of the support elements transverse to the winding path is preferably at most 3 times, furthermore preferably at most 2 times, and particularly preferably at most 1.5 times, the diameter of the conductor wire to be wound.

In the case of one variant of embodiment, the support elements project beyond the circumferential face by at least 1.5 times, preferably by at most 3 times, the diameter of the conductor wire to be wound. A lateral support of a second layer of conductor wires is possible beyond approximately 1.5 times the diameter of the conductor wire. The preferred upper limit, specifically 3 times the diameter of the conductor wire, enables a lateral support of a third layer of conductor wires. Up to this height the support elements can still be designed so as to be comparatively narrow such that the spacing between two adjacent windings of the winding path is kept low. Moreover, up to this upper limit it is still possible by way of suitable measures for the coil windings to be sloughed off from the coil former and be deposited in a drawing-in tool.

In one particular embodiment of the coil former it is provided that said coil former has a wire infeed installation for a plurality of conductor wires by way of which a first part of the plurality of conductor wires are capable of being deposited so as to be mutually parallel in a first layer on the winding path and simultaneously a second part of the plurality of conductor wires are capable of being deposited so as to be mutually parallel in a second layer on the first layer. It is advantageous herein that the plurality of conductor wires is wound onto the coil former, wherein the sum of the wire length per revolution of the coil former is high in relation to the length requirement along the coil former. The layers are preferably simultaneously applied to the coil former. The plurality of conductor wires is preferably at most 40, furthermore preferably at most 35, and particularly preferably at most 30. Moreover, the plurality of conductor wires is preferably at least 4, furthermore preferably at least 5, even more preferably at least 6, particularly preferably at least 8.

In the case of one special design embodiment, the wire infeed installation has single-wire guides for the plurality of conductor wires, wherein the single-wire guides for the first part of the plurality of conductor wires are disposed along a first row, and wherein the single-wire guides for the second part of the plurality of conductor wires are disposed along a second row. The conductor wires are thus sorted to form two layers already before being deposited on the coil former. To this end, the first and the second row should be disposed so as to be mutually parallel and adjacent.

In the practical application it has proven particularly expedient for the second part of the plurality of conductor wires to be the balance of the plurality of conductor wires. All conductor wires are thus divided among the first and the second layer.

Alternatively however, an embodiment of the coil former in which said coil former has a wire infeed installation for a plurality of conductor wires is also possible, by way of which wire infeed installation simultaneously a first part of the plurality of conductor wires is capable of being deposited in a mutually parallel manner in a first layer on the winding path, a second part of the plurality of conductor wires is capable of being deposited in a mutually parallel manner in a second layer on the first layer, and the remaining part of the plurality of conductor wires are capable of being deposited in a mutually parallel manner in a third layer on the second layer. On account thereof, even more windings per coil former length can be deposited on the coil former. In principle, even more than three layers of conductor wires could be provided. However, based on an upper limit of at most 40 conductor wires, an embodiment having a maximum of five layers suffices.

The support elements according to the invention prevent in particular the conductor wires of the first layer slipping. Additionally, the supporting elements are intended to prevent the conductor wires of the second layer dropping onto the circumferential face or making their way between the conductor wires of the first layer. The same applies in analogous manner to variants of embodiments in which more than two layers are provided.

A design embodiment in which the homogenous width of the helical winding path is wider than the sum of the diameter of the conductor wires of the first layer is advantageous. The conductor wires of the first layer thus fit between the support elements without being squashed and/or damaged. It is furthermore preferable for the homogenous width of the helical winding path to be smaller than the sum of the diameter of the conductor wires of the first layer plus the diameter of a further (absent) conductor wire. No additional conductor wire thus fits between the support elements, on account of which the conductor wires of the second layer do not drop onto the circumferential face or are urged between the conductor wires of the first layer, respectively.

In order for as many conductor wires as possible to be able to be layered between the support elements, an arrangement according to which the number of the conductor wires in the first layer corresponds to the number of the conductor wires in the second layer and, in as far present, the further layers, is expedient.

In the case of one special embodiment of the coil former it is furthermore provided that the support elements comprise first support elements which are retractable, preferably completely retractable, into the circumferential face. This facilitates the sloughing-off of the coil windings from the coil former.

A design embodiment in which a plurality or all of the first support elements have common drive means is to be preferred herein. An automated retraction of the support elements is possible on account thereof, and the costs for the common drive means are minor.

A design embodiment that is simple in terms of construction can be achieved when a plurality or all of the first support elements are disposed on a common carrier element, wherein the carrier element including said first support elements is retractable relative to the circumferential face. The carrier element is preferably an elongate carrier strip. Such a carrier strip can be aligned so as to be parallel to the winding axis. This is implementable in a simple and cost-effective manner in terms of construction. Moreover, such a carrier strip can be mounted so as to be retractable in a groove in the coil former front part or the coil former rear part. This is also implementable with little complexity in terms of construction. Specifically, the groove can be designed so as to be open in the direction of the circumferential face. The first support elements are preferably disposed along the carrier strip. Moreover, it is preferable for the carrier strip in a non-retracted position, that is to say particularly during winding, to configure part of the circumferential face or configure portions of the winding path.

One option in terms of a design embodiment lies in that the common drive means is a slider element which is mounted so as to be displaceable along a slider axis, wherein the slider axis is aligned so as to be transverse to a moving direction of the retractable first support elements, and wherein the slider element is kinematically coupled to the retractable first support elements. By means of the slider element a drive motor can be disposed outside the coil former front part and the coil former rear part of the coil former. A cam gear, or a radial cam, respectively, is suitable for the kinematic coupling, for example.

In one further variant of the design embodiment it is provided that the support elements comprise second support elements which are not retractable into the circumferential face. Said support elements are particularly simple and cost-effective in production. Moreover, said support elements are particularly reliable in terms of operation.

According to one special embodiment of the coil former, the helical winding path has a first extension direction and a second extension direction aligned so as to be transverse to said first extension direction, wherein the coil former front part and the coil former rear part are mounted in a mutually relative manner such that a first span of the helical winding path in the first extension direction is capable of being set by setting the position of the coil former front part and/or of the coil former rear part, and wherein a second span of the helical winding path is configured in the second extension direction. The first span can thus be reduced after the winding, this facilitating the sloughing-off of the wound coil windings. The first span of the helical winding path in the first extension direction is preferably capable of being set by setting the position of the coil former front part and/or of the coil former rear part along the first extension direction.

With a view to being used in an automated manner, it is preferable for the coil former to have an actuator drive by way of which the setting of the position of the coil former front part and/or of the coil former rear part takes place.

In one variant of the design embodiment it is furthermore proposed that the first support elements are aligned in the direction of the second extension direction. Specifically, the span in the second extension direction is preferably not variable, on account of which the sloughing-off of the coil windings by way of the support elements disposed here is impeded. The coil windings can easily overcome the first support elements on account of the potential retraction of the first support elements sitting here. The first support elements are preferably disposed exclusively on the coil former front part. The freedom of movement of the coil windings when sloughing-off here is specifically limited by virtue of being guided in the drawing-in lamellas. Production costs for retractable first support elements are first incurred only for the coil former front part but not for the coil former rear part.

One embodiment of the coil former provides that at least part of the second support elements are aligned in the direction of the first extension direction. By virtue of the preferably variable span in the first extension direction it is not necessary for the second support elements to be retracted. The reasonably dimensionally stable coil windings readily slide over the second support elements as soon as the span has been reduced. Part of the second support elements can also be aligned in the direction of the second extension direction. At least part of the second support elements, preferably all second support elements, are preferably disposed on the coil former rear part. The non-retractable second support elements here can slide over the second support elements in a comparatively simple manner when the span in the first extension direction is reduced.

Several of the optional features are particularly suitable when the first span is larger than the second span. On account thereof, the adjustment of the span in the first extension direction is facilitated, for example, without the coil former front part and the coil former rear part becoming unstable. Moreover, elongate oval to rectangular coil windings on account thereof, said coil windings by way of the short sides thereof being threaded onto the drawing-in tool.

The second span of the helical winding path is preferably invariable. This minimizes the complexity and the intricacy of design of the coil former, and keeps the stiffness thereof high.

In the case of one special embodiment, the coil former front part and the coil former rear part are disposed on a coil former base. Design embodiments in which the coil former front part and the coil former rear part directly connected to one another are indeed also possible. However, a more stable mounting of said coil former front part and said coil former rear part is in most instances more successfully achieved by way of a coil former base. The coil former front part and/or the coil former rear part herein can be fixedly connected to the coil former base, or can be configured so as to be integral to the latter. This is particularly stable. However, preferably at least one part of the group of coil former front part and coil former rear part is mounted so as to be movable on the coil former base. The coil former shape can thus be varied, preferably shortened in one extent, on account of the movement. A design embodiment according to which the coil former front part and/or the coil former rear part are mounted so as to be longitudinally displaceable on the coil former base is to be particularly preferred. The adjustment of the coil former can thus be conceived so as to be uniform across the entire length.

A coupling means for linking to a rotary drive can be disposed on the coil former base, wherein the coupling means defines a rotation axis of the coil former. The coil former is thus connectable to a rotary drive. The coupling means is preferably disposed on a rear side of the coil former base. The coil former front part and the coil former rear part are preferably disposed on a front side of the coil former base.

Furthermore, the coil former base should have a wire fixing location in the region of the start of the winding path. The ends of the conductive wire or the conductor wires can be fixed in the latter before winding.

According to one special embodiment, the helical winding path is subdivided into winding stages, wherein the circumference of a winding about the coil former decreases in stages from the start of the helical winding path toward the end of the helical winding path, in particular so as to correspond to the winding stages. Coil windings having dissimilar circumferential lengths and/or for deviating lamella positions in the drawing-in tool can thus be produced. The windings of each winding stage are then later drawn into dissimilar drawing-in grooves of a stator carrier.

The invention moreover relates to a winding device having a coil former as described above and below, wherein the coil former is mounted on a rotary drive, and having a drawing-in tool which has a flat ring from drawing-in lamellas which are aligned so as to be parallel and geodetically vertical, wherein the coil former and the drawing-in tool are mounted so as to be mutually movable in such a manner that a coil winding that is wound from conductor wire on the coil former is capable of being placed from above about one or part (in particular an integer) of the drawing-in lamellas. The advantages correspond to those of the coil former per se, wherein it is to be pointed out in particular that the sum of the wire length per revolution of the coil former in comparison to the length requirement along the coil former is capable of being conceived so as to be high.

The drawing-in lamellas are typically fastened at the lower end thereof and at the upper end thereof are free-standing. It is moreover expedient for the drawing-in tool be disposed on a tool table. The latter is preferably mounted so as to be rotatable and/or displaceable conjointly with the drawing-in tool. On account thereof, the drawing-in tool can be positioned in relation to the coil former. The coil former is preferably mounted so as to be suspended below the rotary drive. The winding device should moreover have a wire storage unit having in particular a wire supply.

When winding coil windings in more than one layer it is expedient for the spacing between the drawing-in lamellas to be configured so as to be slightly larger than the factor calculated from the diameter of a conductor wire and the number of layers, that is to say spacing>(diameter of a conductor wire)×(number of layers). However, said spacing should also be smaller than the factor calculated from the diameter of a conductor wire and the number of layers plus 1, that is to say spacing<(diameter of a conductor wire)×(number of layers+1). The conductors which initially lie on top of one another can thus continue to lie so as to be adjacent between the lamellas and moreover be pushed simultaneously, that is to say in a mutually parallel manner, into the drawing-in groove. The drawing-in per conductor wire is particularly rapid on account thereof, and a high fill factor is achieved.

The invention furthermore relates to a method for operating a winding device as described above and below, for producing coil windings using the coil former and equipping the drawing-in tool for later drawing said coil windings into a stator carrier, in which method winding of conductor wire along the helical winding path onto the coil former by rotating the coil former is first performed. Subsequently, placing the windings of the conductor wire that run along the helical winding path about one or part of the drawing-in lamellas of the drawing-in tool is performed. Thereafter, sloughing off of the windings of the conductor wire that run along the helical winding path from the coil former beyond the support elements and placing said windings in the drawing-in tool takes place. According to the method, the support elements prevent a positional variation of the individual windings of the conductor wire until being sloughed off. This ultimately results in a high achievable fill factor of the drawing-in grooves, as well as a few eddy currents and a high efficiency of the stator.

The steps of winding, placing, and sloughing-off are preferably repeated until at least all coil windings of a phase of a stator of an electric motor have been placed in the drawing-in tool.

In one special design of the method the support elements project beyond the circumferential face by at least 1.5 times, preferably by at most 3 times, the diameter of the conductor wire to be wound, wherein the coil former has a wire infeed installation for a plurality of conductor wires by way of which a first part of the plurality of the conductor wires are deposited so as to be mutually parallel in a first layer on the winding path, and simultaneously a second part of the plurality of conductor wires are deposited so as to be mutually parallel in a second layer on the first layer. It is thus achieved that the sum of the wire length per revolution of the coil former is high in comparison to the length requirement along the coil former. The coil former is correspondingly short, stable, and positionally true during the winding-related tensile force which is exerted by the tensioned conductor wires.

According to one further method option it is provided that the support elements comprise first support elements which are retractable into the circumferential face, wherein the first support elements after placing the windings about the drawing-in lamellas and before sloughing off the windings from the coil former are retracted into the circumferential face. This facilitates the drawing-off since the coil windings slide readily over the retracted first support elements.

Additionally or alternatively, it can optionally be provided that the helical winding path has a first extension direction and a second extension direction aligned so as to be transverse to said first extension direction, wherein the coil former front part and the coil former rear part are mounted in a mutually relative manner such that a first span of the helical winding path in the first extension direction is capable of being set by setting the position of the coil former front part and/or of the coil former rear part, wherein a second span of the helical winding path is configured in the second extension direction, and wherein the position of the coil former front part and/or the coil former rear part after the placing of the windings about the drawing-in lamellas and before the sloughing-off of the windings is set such that the first span is shortened. The coil windings can thus be easily sloughed off.

Experiments have led to the surprising result of an increase in efficiency of the stator when the placing pattern of the plurality of parallel conductor wires in a method step is rotated by 180 degrees (or a multiple thereof), specifically after each half or full revolution of the coil former. The twists thus produced in the coil windings are positioned later when drawing-in into the drawing-in grooves on the stator ends, that is to say outside the drawing-in grooves. The increase in efficiency can also be achieved without support elements along the winding path. The twisting is particularly effective when winding the conductor wire onto the coil former in multiple layers. The support elements are preferably provided to this end. In order for the twisting be achieved, the wire infeed installation can be coupled to a reversing installation in such a manner that the wire infeed installation conjointly with the latter is pivotable in a reciprocating manner by 180 degrees (or a multiple thereof). This preferably takes place about a (virtual) pivot axis which lies in the center of the plurality of conductor wires guided in parallel.

The method can furthermore be carried out while including all features mentioned above and below of the coil former and the winding device.

The winding device as well as the method can optionally be enhanced with a view that at least two of the coil formers according to the invention are positioned beside one another and communicate with the same drawing-in tool. Such a second coil former can be supplied with wire by way of a second wire supply and a second wire infeed installation for second wires. The rotary drives of the first and the second coil former are preferably simultaneously actuatable, preferably synchronized. The first and the second coil former are moreover mounted so as to be displaceable in relation to the drawing-in tool in such a manner that a coil winding generated on the first coil former is capable of being contemporaneously or almost contemporaneously deposited about one or part of the lamellas of the drawing-in tool conjointly with a coil winding generated on the second coil former. This preferably takes place in a diametrically opposite manner. This has the advantage that at least two coil windings can be produced contemporaneously or almost contemporaneously on separate coil formers which however are functionally linked to the device, and said coil windings then can also be deposited contemporaneously in the drawing-in tool. On account thereof, the entire machine is barely larger than a device having only one coil former because only slightly more base area has to be substantially provided for the wire supplies in the production planning. The coil formers can be disposed on a common carrier such that a common actuator drive can move the two coil formers having the coil windings wound thereon in a synchronous manner relative to the drawing-in tool.

BRIEF DESCRIPTION OF THE SEVERAL VIEWS OF THE DRAWINGS

Further features, details, and advantages of the invention are derived from the wording of the claims as well as from the following description of exemplary embodiments by means of the drawings in which:

DESCRIPTION OF SPECIFIC EMBODIMENTS OF THE INVENTION

Figure 1:
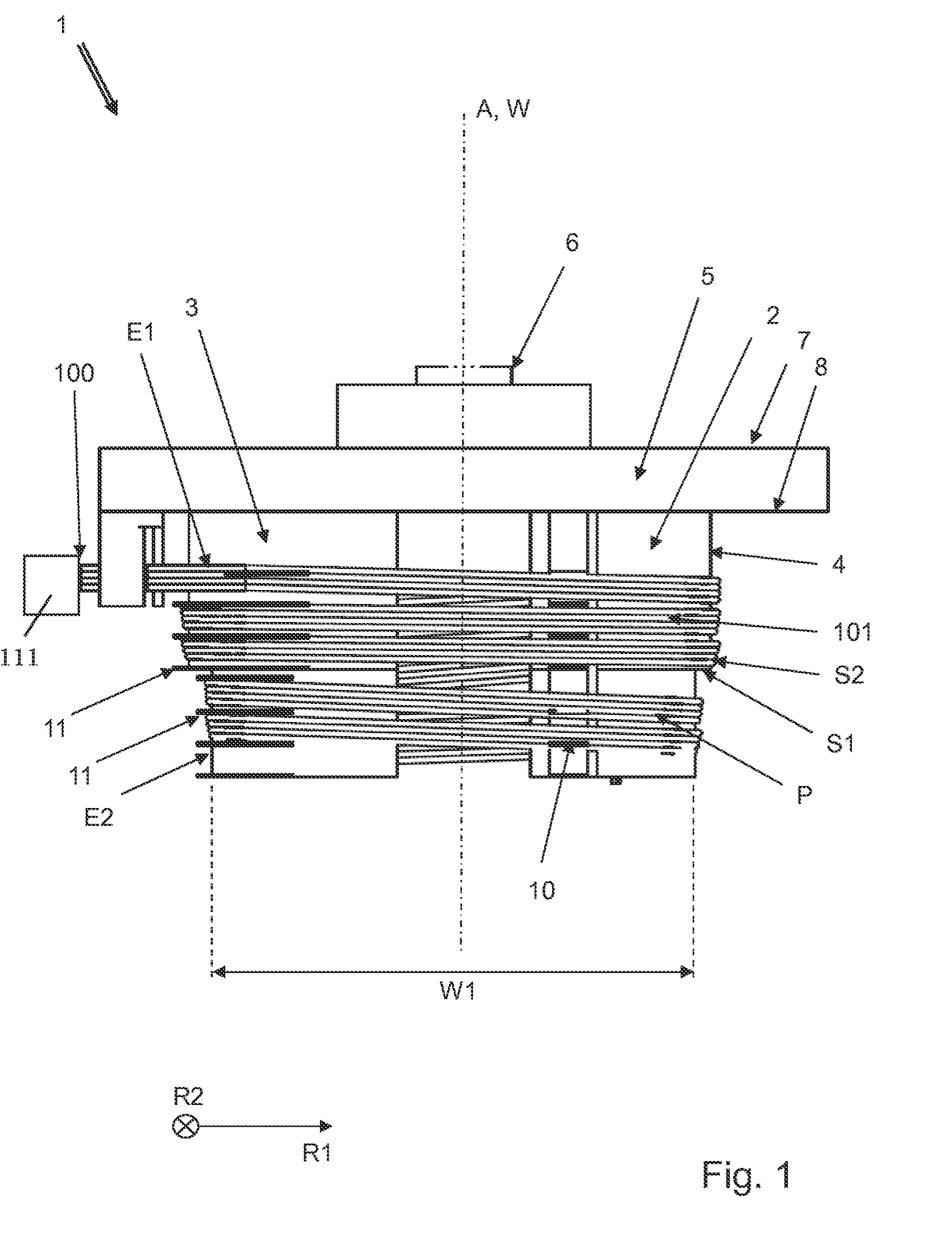
FIG. 1 shows a lateral diagrammatic view of a coil former.
Figure 2:
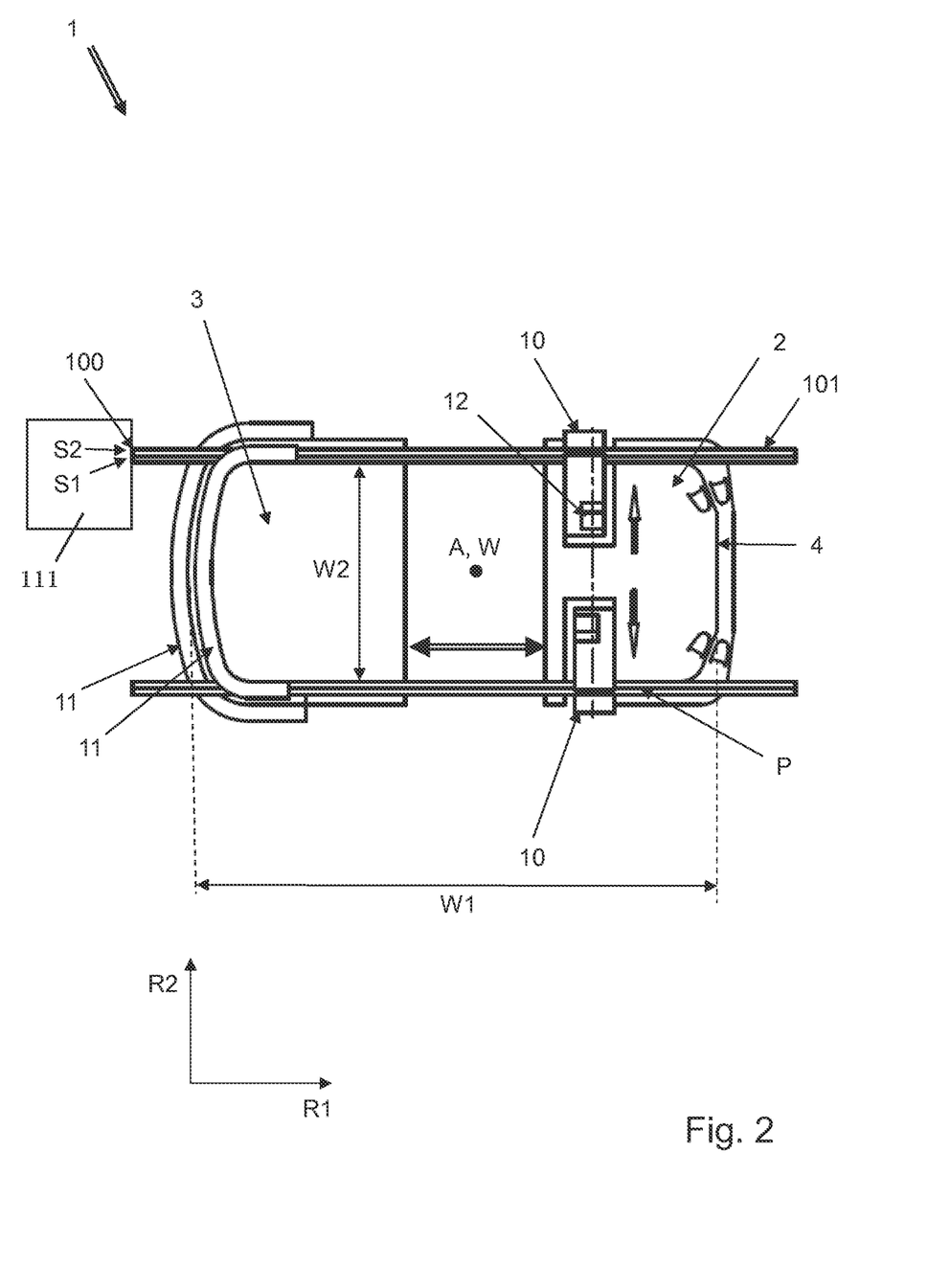
FIG. 2 shows a schematically illustrated cross section through a coil former.
Figure 3:
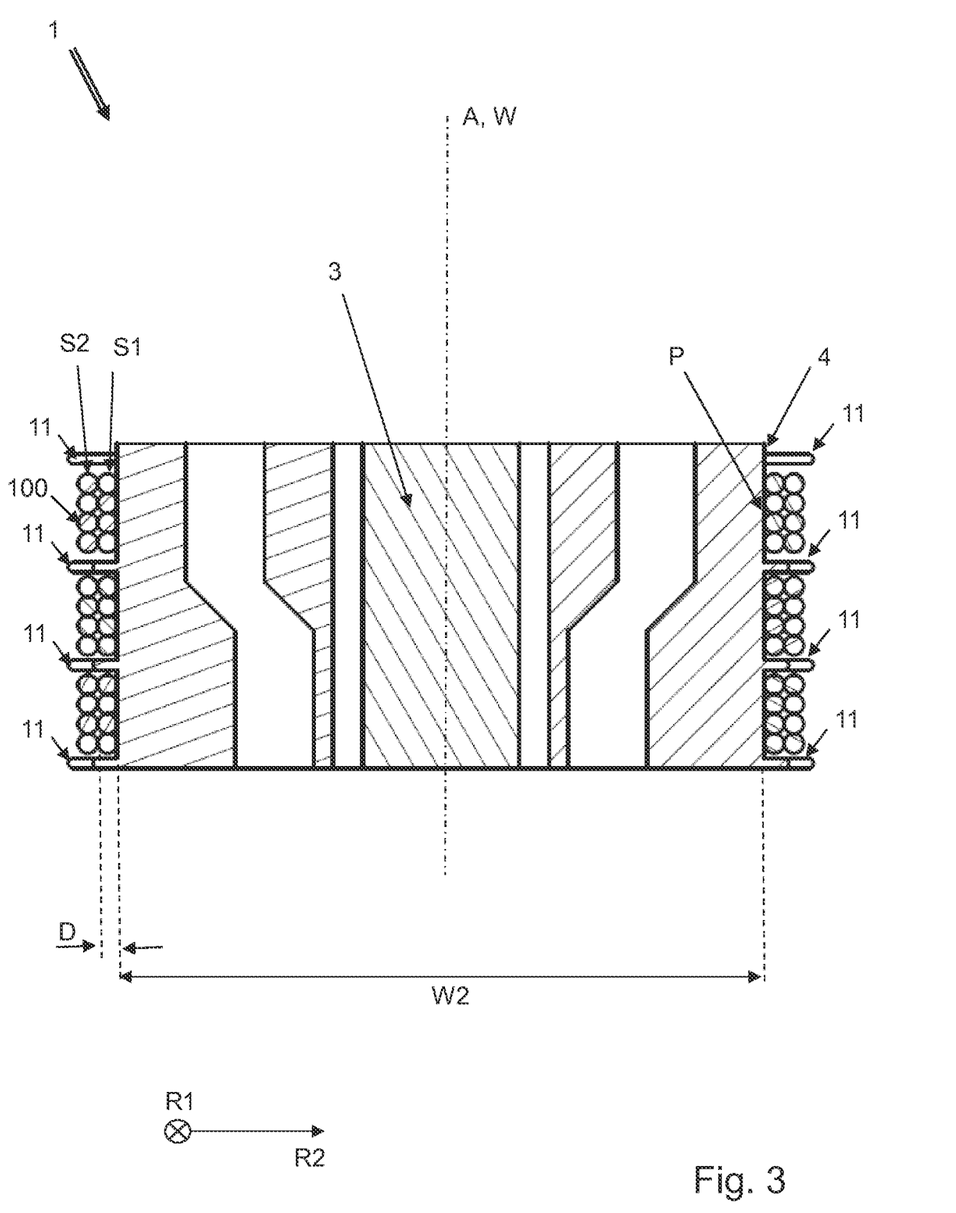
FIG. 3 shows a schematically illustrated longitudinal section through a coil former.

A coil former 1 can be seen in a lateral sketch view in FIG. 1. The coil former 1 serves for winding conductor wire 100 so as to form coil windings 101 for stators, said coil windings 101 being subsequently deposited in a drawing-in tool. FIG. 2 shows a schematically illustrated cross section, and FIG. 3 shows a schematically illustrated longitudinal section through a coil former that is comparable to the one in FIG. 1. The same reference signs identify technical features of the same type.

It can be seen in FIG. 1 that the coil former 1 has a coil former front part 2 and a coil former rear part 3 which conjointly configure a common circumferential face 4. The latter defines a helical winding path P about a helix axis W for the conductor wire 100. The winding path P is a result of the conductor wire 100 later being wound on the circumferential face 4 and need not be recognizable by physical elements on the circumferential face 4. The only fundamental precondition is that the circumferential face 4 is suitable for depositing a conductor wire 100 in a helical manner. The circumferential face 4 is aligned so as to be substantially parallel to the helix axis W. Two indents of the circumferential face 4 can presently be seen, wherein the circumference about the circumferential face 4 of the upper indent is larger than the circumference of the lower indent. Said indents are referred to as winding stages. The helical winding path P is thus subdivided into winding stages, wherein the circumference of a winding about the coil former 1 decreases in stages from a start E1 of the helical winding path P toward an end E2 of the helical winding path P. The coil windings 101 of dissimilar winding stages are later placed about deviating drawing-in lamellas of a drawing-in tool and consequently also drawn into dissimilar drawing-in grooves of a stator carrier.

The helical winding path P has a first extension direction R1 and a second extension direction R2 aligned so as to be transverse to said first extension direction R1 such that a wound coil winding 101 has a first diameter according to a first span W1 of the helical winding path P in the first extension direction R1. Moreover, the wound-up coil winding 101 has a second diameter, aligned transversely to said first extension direction R1, said diameter resulting from a second span W2 (cf. FIG. 2) of the helical winding path P in the second extension direction R2.

The coil former front part 2 and the coil former rear part 3 are disposed on a front side 8 of a coil former base 5. The start E1 of the winding path P herein lies in the region of the coil former base 5, and the end E2 lies at the opposite end of the coil former front side and coil former rear side 2, 3. Opposite the front side 8, the coil former base 5 has a rear side 7 on which a coupling means 6 for linking to a rotary drive is disposed. The coupling means 6 defines the rotation axis A of the coil former 1.

The coil former rear part 3 is furthermore mounted so as to be movable, in particular longitudinally displaceable, on the coil former base 5. The coil former front part 2 is fixedly connected to the coil former base 5. On account thereof, the coil former front part 2 and the coil former rear part 3 are mounted in a mutually relative manner such that the first span W1 of the helical winding path P is capable of being set by setting the position of the coil former rear part 3 along the first extension direction R1. To this end, an actuator drive by way of which the setting of the position of the coil former rear part 3 takes place is preferably provided. Overall, the first span W1 is larger than the second span (cf. reference sign W2 in FIGS. 2 and 3), the latter not being able to be varied by setting.

A wire fixing location is furthermore disposed on the coil former base 5 in the region of the start E1 of the winding path P. The free ends of the conductor wire or conductor wires 100 are fixed in the latter before winding.

It can furthermore be seen that support elements 10, 11 are disposed along the winding path P. Said support elements 10, 11 project beyond the circumferential face 4 and in regions laterally delimit the helical winding path P. To this end, the support elements 10, 11 are disposed in such a manner that the helical winding path P has a homogenous width. The support elements 10, 11 protrude beyond the circumferential face 4 by more than 1.5 times the diameter of the conductor wire 100 to be wound.

Moreover, the support elements 10, 11 are elongate and aligned so as to be transverse to the helix axis W. Optionally, said support elements 10, 11 can also be aligned so as to be oblique in particular such that said support elements 10, 11 are aligned so as to be parallel to the winding path P. The width of the support elements 10, 11 transverse to the winding path P is approximately the diameter of the conductor wire 100 to be wound.

By means of a wire infeed installation 111 for a plurality of conductor wires 100, a first part of the plurality of conductor wires 100 are deposited so as to be mutually parallel in a first layer S1 on the winding path P and simultaneously a second part of the plurality of conductor wires 100, specifically the remaining conductor wires 100, are deposited so as to be mutually parallel in a second layer S2 on the first layer S1. Presently, eight conductor wires 100 are simultaneously wound in two four-ply layers S1, S2. All conductor wires 100 have the same diameter and are enameled copper wires which are provided by way of individual wire storage units having a wire supply.

In order to be able to deposit the conductor wires 100 in an orderly manner on the winding path P, the wire infeed installation should have wire guides for the conductor wires 100, in particular single-wire guides in which a conductor wire is individually guided, or multiple-wire guides in which at least two conductor wires are guided in an adjacent and mutually contacting manner. The wire guides for the first part of the plurality of conductor wires 100 should be disposed along a first row, and the wire guides for the second part of the plurality of conductor wires 100 along a second row. The rows then preferably lie so as to be adjacent and mutually parallel.

The support elements 10, 11 prevent the conductor wires 100 of the first layer S1 slipping. Moreover, said support elements 10, 11 prevent the conductor wires 100 of the second layer S2 dropping onto the circumferential face 4, in particular in that said support elements 10, 11 hold the first layer S1 together.

It can be seen that the homogenous width of the helical winding path P is somewhat wider than the sum of the diameters of the conductor wires 100 of the first layer S1 (cf. in particular FIG. 3). However, no further conductor wire 100 passes therebetween anymore. In other words, the homogenous width of the helical winding path P is smaller than the sum of the diameters of the conductor wires 100 of the first layer S1 plus the diameter of a further (absent) conductor wire. The number of conductor wires 100 in the first layer S1 preferably corresponds to the number of the conductor wires 100 in the second layer S2.

In order for the coil winding 101 to be able to readily slip downward from the coil former, part of the support elements 10, 11 is configured by first support elements 10 which are distinguished in that said support elements 10 are retractable into the circumferential face 4. A plurality of the first support elements 10 share a common drive means 12 (cf. FIG. 2 to this end), which is configured as a slider element. The slider element is mounted so as to be displaceable along a slider axis which is aligned so as to be parallel to the winding axis W. On account thereof, the slider axis is aligned so as to be transverse to a moving direction of the driven first support elements 10. The slider element is kinematically coupled to the retractable first support elements 10 by means of a radial cam or a cam gear, respectively. As can be seen, all first support elements 10 are aligned in the direction of the second extension direction R2 and are disposed on the coil former front part 2. Moreover, a plurality of support elements 10 sit on a common carrier strip which is aligned so as to be parallel to the winding axis W and mounted so as to be retractable in a groove in the coil former front part 2. The first support elements 10 are disposed along the support strip. The groove is configured so as to be open in the direction of the circumferential face 4. The support strip in a non-retracted position, that is to say during the winding of the conductor wire, conjointly with the regions between the first support elements 10 configures part of the circumferential face 4 and thus also portions of the winding path.

However, not all support elements 10, 11 are retractable, but second support elements 11 which are not retractable into the circumferential face 4 are also provided. All said second support elements 11 are disposed on the coil former rear part 3. The second support elements 11 point in the direction of the first and the second extension direction R1, R2.

Figure 4:
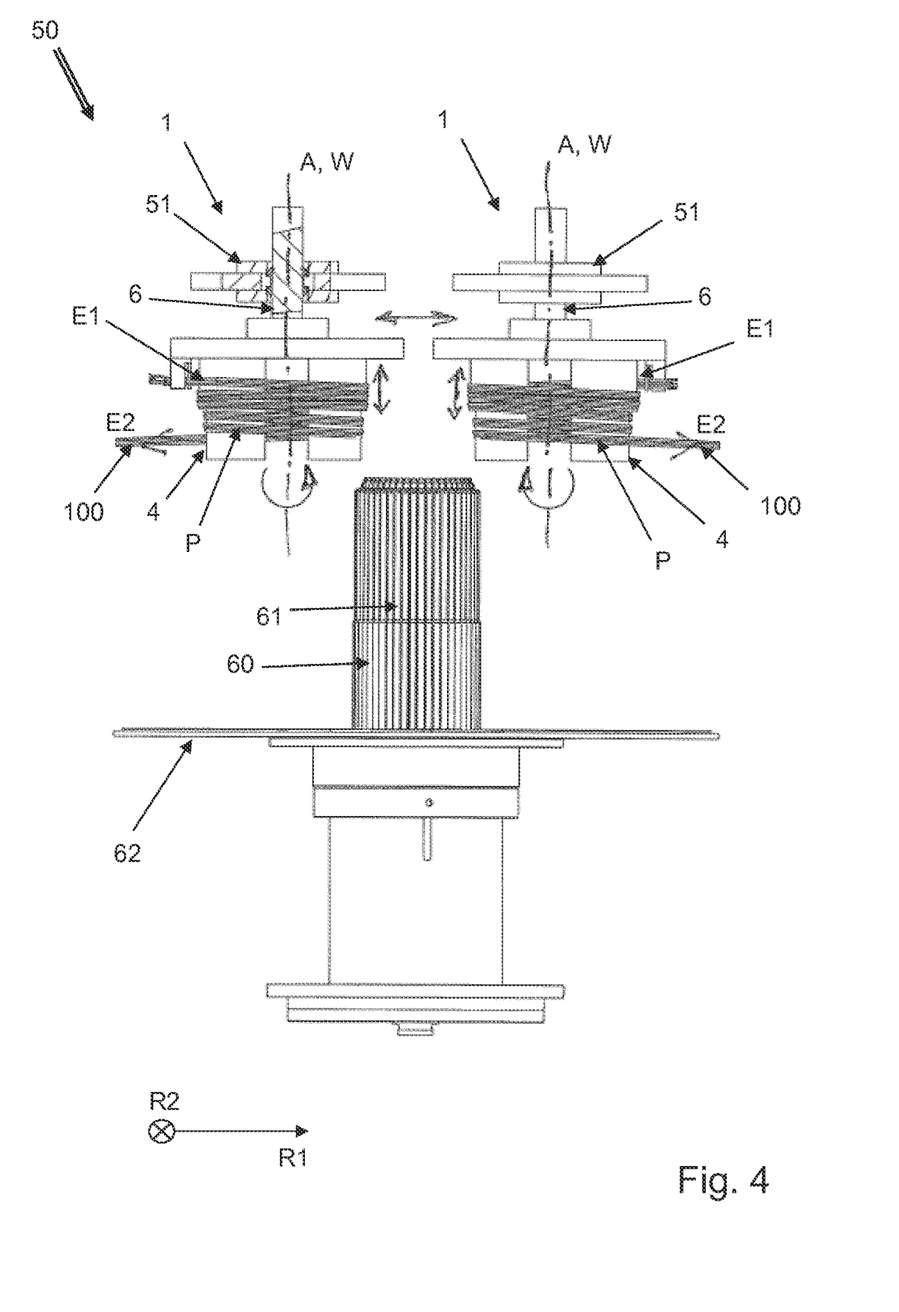
FIG. 4 shows a winding device having two coil formers and one drawing-in tool.

FIG. 4 shows a winding device 50 having two coil formers 1 and one drawing-in tool 60. However, the invention expressly relates also to embodiments having only one coil former 1. The two coil formers 1 in terms of the technical features thereof correspond in each case to those of FIGS. 1, 2, and 3. However, the two coil formers 1 are configured so as to be mutually mirror-symmetrical and are operated in a counter-rotating manner. In principle, three or four coil formers could also be provided.

Each of the coil formers 1 is mounted so as to be suspended below a rotary drive 51. A tool table 62 on which a drawing-in tool 60 is disposed is placed below the coil formers 1. The tool table 62 is mounted so as to be rotatable and displaceable conjointly with the drawing-in tool 60. The drawing-in tool 60 possesses a circular flat ring from drawing-in lamellas 61 that are aligned so as to be parallel and geodetically vertical. The number of drawing-in lamellas corresponds to the number of drawing-in grooves of the stator carrier to be later equipped. Moreover, the drawing-in lamellas 61 are fastened at the lower end thereof and at the upper end thereof are free-standing.

The coil formers 1 and the drawing-in tool 60 are now mounted so as to be mutually movable in such a manner that the coil windings 101 that are wound from conductor wire 100 on the coil former 1 are in each case capable of being placed from above about one or part of the drawing-in lamellas 61. This preferably takes place in a diametrically opposite manner. The majority of the coil windings 101 herein lies outside the drawing-in tool 60 and is deposited on the tool table 62.

A method for generating coil windings 101 using the coil former 1 and equipping the drawing-in tool 60 for later drawing-in said coil windings 101 into a stator carrier (cf. reference sign 70 in FIG. 5) is capable of being carried out by way of such a winding device 50, the following steps being carried out in said method:

winding conductor wire 100 along the helical winding path P onto the coil former is 1 by rotating the coil former 1;

subsequently placing the windings of the conductor wire 100 that run along the helical winding path P about one or part of the drawing-in lamellas 61 of the drawing-in tool 60;

subsequently sloughing-off the windings of the conductor wire 100 that run along the helical winding path P from the coil former 1 beyond the support elements 10, 11, and depositing said windings in the drawing-in tool 60.

These steps are to be repeated until all coil windings 101 of a phase of a stator of an electric motor are deposited in the drawing-in tool 60.

When winding on each coil former 1, a first part of a plurality of conductor wires 100 is preferably deposited so as to be mutually parallel in a first layer S1 on the winding path P, and simultaneously a second part of the plurality of conductor wires 100 is deposited so as to be mutually parallel in a second layer S2 on the first layer S1.

The first support elements 10 after the placing of the windings about the drawing-in lamella 61 and before sloughing-off the windings from the coil former 1 are preferably retracted into the circumferential face 4.

Additionally, the position of the coil former rear part 3 after the placing of the windings about the drawing-in lamellas 61 and before the sloughing-off of the windings should be set such that the first span W1 is shortened. This can take place before, after, or simultaneously with the retraction of the first support elements 10.

Figure 5:
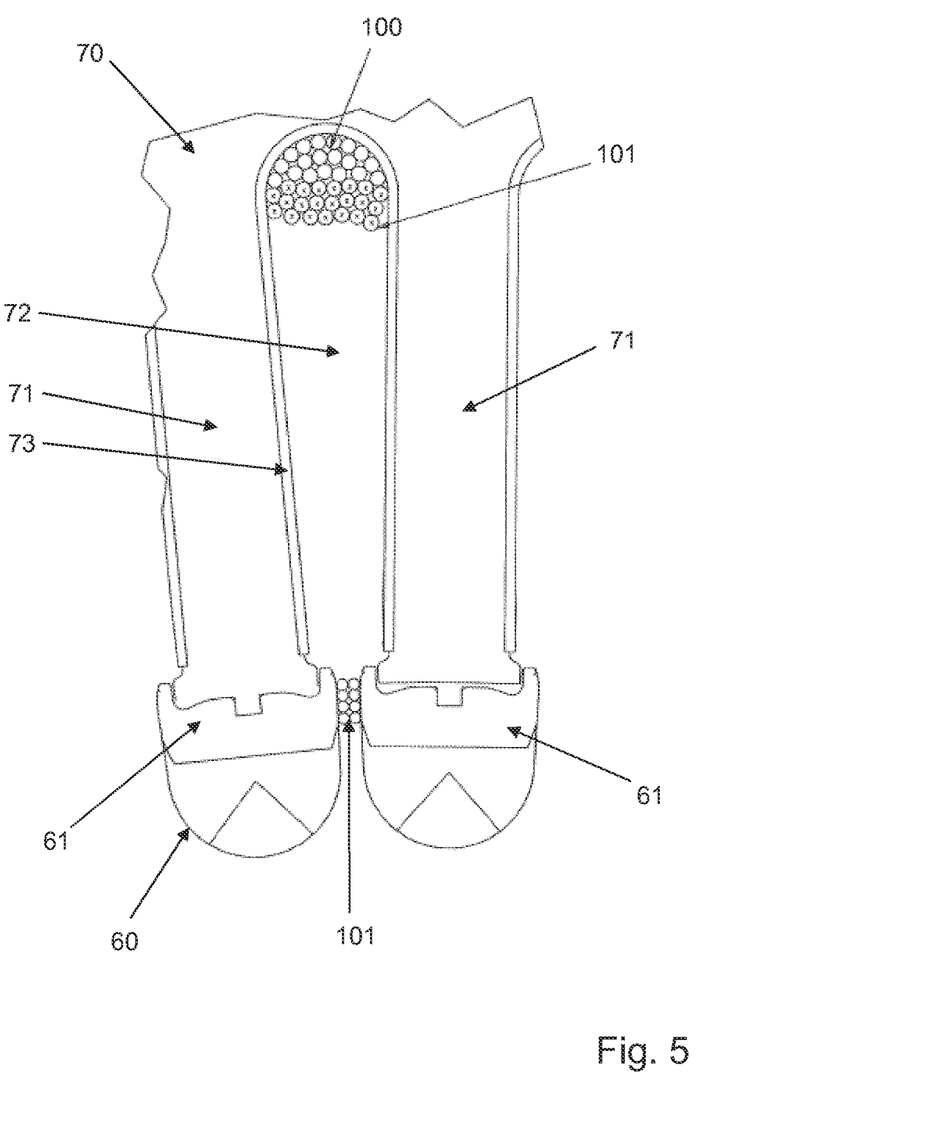
FIG. 5 shows a fragment of a cross-section through a drawing-in lamella and a drawing-in groove.

A fragment of a cross-section through two drawing-in lamellas 61 of a drawing-in tool 60, and a drawing-in groove 72 between two stator teeth 71 of a stator carrier 70 can be seen in FIG. 5. The drawing-in lamellas 61 are placed in a form-fitting manner onto the stator teeth 71 so that said drawing-in lamellas 61 cannot vary the position thereof when drawing-in. An insulation layer 73 is first incorporated within the drawing-in grooves 72 so that the stator carrier 70 is not energized in the event of a breakage of the insulation on a conductor wire 100. For example, an insulation paper can be inserted as the insulation layer 73 in the drawing-in groove 72. As can be seen, a few coil windings 101 have already been drawn into the drawing-in groove 72. Moreover, eight further conductor wires 100 of a coil winding 101 are pushed through between the two drawing-in lamellas 61. Said further eight conductor wires 100, as when winding, lie in a first and a second layer so that two conductor wires 100 lying beside one another are always simultaneously drawn into the drawing-in groove. To this end, the spacing between the drawing-in lamellas is slightly larger than the factor calculated from the diameter of a conductor wire and the number of layers. Moreover, the spacing is smaller than the factor calculated from the diameter of a conductor wire and the number of layers plus 1. That is to say: (diameter of a conductor wire)×(number of layers)<spacing<(diameter of a conductor wire)×(number of layers+1).

The invention therefore also relates to an additional or independent method for drawing-in coil windings, in which method coil windings with the aid of a drawing-in tool having drawing-in lamellas and a drawing-in star, or a drawing-in mushroom, respectively, are drawn through a stator carrier, wherein the spacing between the drawing-in lamellas is slightly larger than the factor calculated from the diameter of a conductor wire and the number of layers according to a preceding winding of the coil windings, and wherein the spacing is smaller than the factor calculated from the diameter of a conductor wire and the number of layers plus 1, and in which a number of conductor wires according to the number of layers is simultaneously drawn in into the drawing-in groove in an adjacent manner.

The invention is not limited to any of the embodiments described above but is capable of being modified in many ways.

All of the features and advantages, including construction details, spatial arrangements, and method steps, derived from the claims, the description, and the drawing can be relevant to the invention both individually as well as in the most varied combinations.

| List of reference signs | |
|---|---|
| 1 | Coil former |
| 2 | Coil former front part |
| 3 | Coil former rear part |
| 4 | Circumferential face |
| 5 | Coil former base |
| 6 | Coupling means |
| 7 | Rear side |
| 8 | Front side |
| 10 | First support elements |
| 11 | Second support elements |
| 12 | Drive means (of the support element) |
| 50 | Winding device |
| 51 | Rotary drive |
| 60 | Drawing-in tool |
| 61 | Drawing-in lamellas |
| 62 | Tool table |
| 70 | Stator carrier |
| 71 | Stator tooth |
| 72 | Drawing-in groove |
| 73 | Electrical insulation layer |
| 100 | Conductor wire |

-continued

| List of reference signs | |
|---|---|
| 101 | Coil winding |
| A | Rotation axis |
| D | Diameter (of the conductor wire) |
| E1 | Start (of the winding path) |
| E2 | End (of the winding path) |
| P | Helical winding path |
| R1 | First extension direction |
| R2 | Second extension direction |
| S1 | First layer |
| S2 | Second layer |
| W | Helix axis |
| W1 | First span |
| W2 | Second span |

What is claimed is:

1. A winding device (50) having a coil former (1), for winding conductor wire (100) so as to form coil windings (101), which has a coil former front part (2) and a coil former rear part (3), wherein the coil former front part (2) and the coil former rear part (3) by way of a circumferential face (4) define for the conductor wire (100) a helical winding path (P) about a helix axis (W) and which coil former (1) is mounted on a rotary drive (51), and having a drawing-in tool (60) which has a flat ring-shaped member formed from drawing-in lamellas (61) which are aligned so as to be parallel and geodetically vertical, wherein the coil former (1) and the drawing-in tool (60) are mounted so as to be mutually movable in such a manner that a coil winding (101) that is wound from conductor wire (100) on the coil former (1) is capable of being placed from above about one or part of the drawing-in lamellas (61);

the winding device (50) being configured for rotating a placing pattern of a plurality of parallel conductor wires (100) by 180 degrees or a multiple thereof after each half or full revolution of the coil former (1), such that twists in the coil winding thus produced are positioned outside a drawing-in groove on a stator when drawing-in the coil winding into the drawing-in groove, and wherein said coil former (1) has a wire infeed installation for a plurality of conductor wires (100) by way of which a first part of the plurality of conductor wires (100) is capable of being deposited so as to be mutually parallel in a first layer (S1) on the winding path (P) and simultaneously a second part of the plurality of conductor wires (100) is capable of being deposited so as to be mutually parallel in a second layer (S2) on the first layer (S1).

2. The winding device (50) as claimed in claim 1, the winding device being configured for rotating the placing pattern by coupling infeeding of conductor wires to reversing thereof such that infeeding of conductor wires conjointly with reversing thereof is pivotable in a reciprocating manner.

3. The winding device (50) as claimed in claim 2, wherein the reversing of conductor wires is pivotable in a reciprocating manner about a pivot axis which lies in the center of a plurality of parallel conductor wires.

4. The winding device as claimed in claim 2, wherein the helical winding path (P) has a first extension direction (R1) and a second extension direction (R2) aligned so as to be transverse to said first extension direction (R1), wherein the coil former front part (2) and the coil former rear part (3) are disposed in a mutually relative manner such that a first span (W1) of the helical winding path (P) in the first extension direction (R1) is capable of being set by at least one of setting the position of the coil former front part (2) and the coil former rear part (3), and;

wherein a second span (W2) of the helical winding path (P) is in the second extension direction (R2).

5. The winding device as claimed in claim 1, wherein support elements (10, 11) which project beyond the circumferential face (4) and laterally delimit the helical winding path (P) are disposed along the winding path (P).

6. The winding device as claimed in claim 5, wherein the support elements (10, 11) are disposed such that the helical winding path (P) has a homogenous width.

7. The winding device as claimed in claim 6, wherein the support elements (10, 11) project beyond the circumferential face (4) by at least 1.5 times, the diameter (D) of the conductor wire (100) to be wound.

8. The winding device as claimed in claim 6, wherein the support elements (10, 11) project beyond the circumferential face (4) by at least 3 times, the diameter (D) of the conductor wire (100) to be wound.

* * * * *